Jan. 23, 1968 — J. N. COOPER ET AL — 3,365,345
METHOD OF MAKING LIGHT-COLORED SIDEWALL TIRES
Filed Dec. 11, 1963
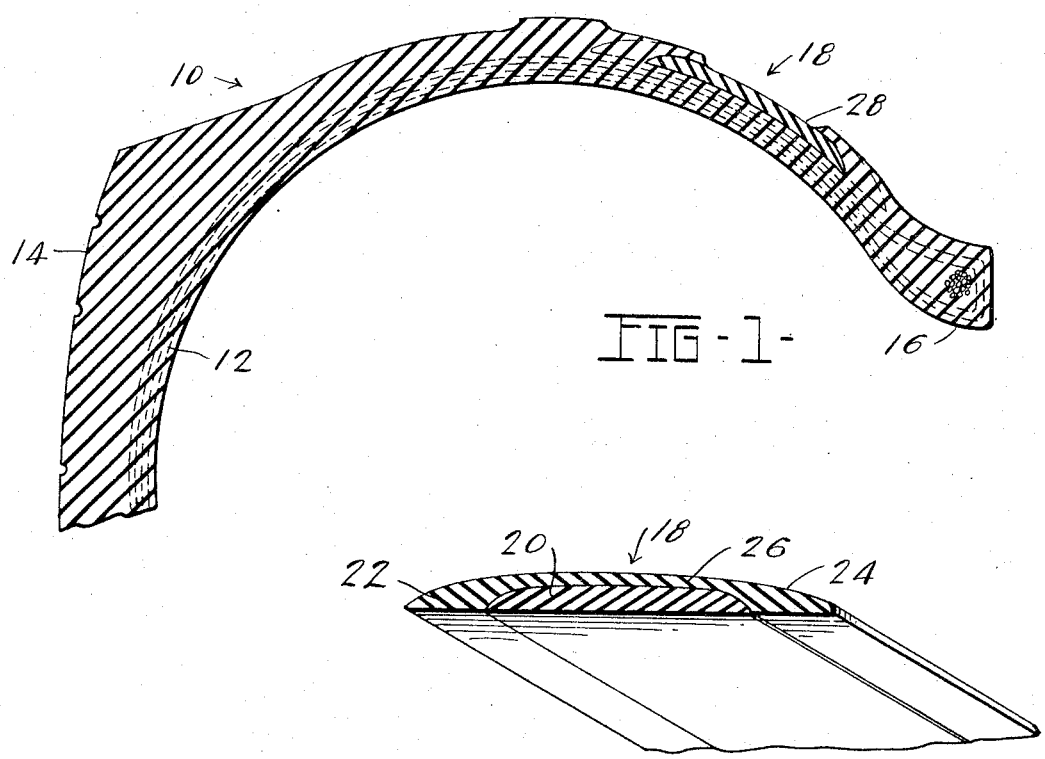
FIG-1-
FIG-2-
FIG-3-
INVENTORS:
JOHN N. COOPER,
ALLAN R. SMITH.
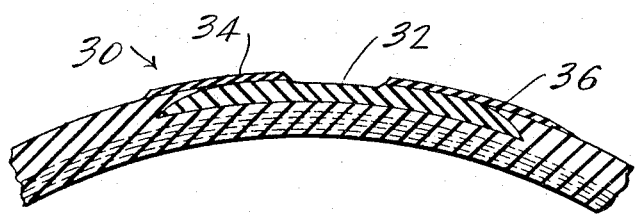
ATT'YS.

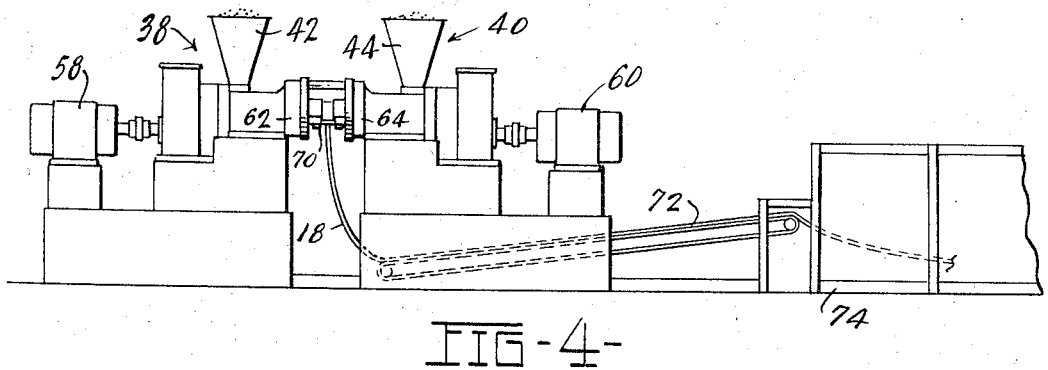
FIG-4-
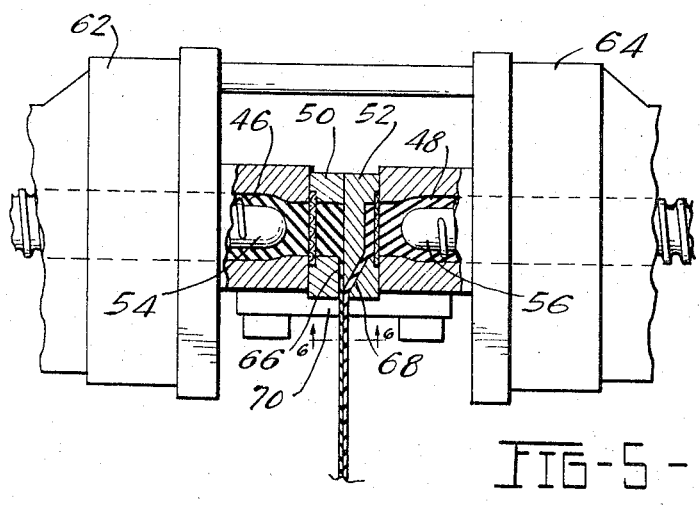
FIG-5-
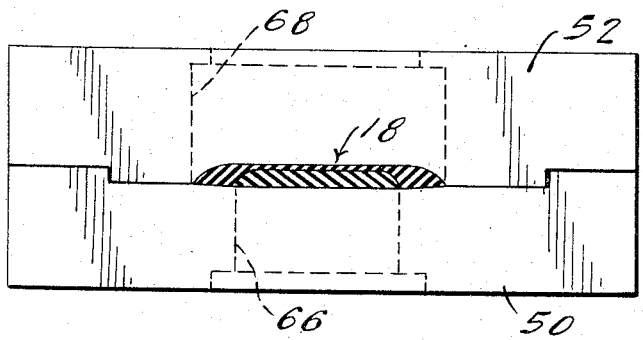
FIG-6-
INVENTORS:
JOHN N. COOPER,
ALLAN R. SMITH.
ATT'YS.

United States Patent Office 3,365,345
Patented Jan. 23, 1968

3,365,345
METHOD OF MAKING LIGHT-COLORED
SIDEWALL TIRES
John N. Cooper and Allan R. Smith, Findlay, Ohio, assignors to Cooper Tire & Rubber Company, Findlay, Ohio, a corporation of Delaware
Filed Dec. 11, 1963, Ser. No. 329,630
5 Claims. (Cl. 156—116)

This invention relates to white sidewall tires and more particularly to an improved process for making white sidewall tires, particularly those having narrow white stripes.

White sidewall tires now have much narrower white stripes than formerly primarily because the narrower stripes are easier to keep clean. Further, the narrow white stripes are often recessed below the surface of the tires for additional protection against dirt and abrasion.

In making white sidewall tires having narrow stripes, a strip of white rubber is positioned on that portion of the carcass corresponding to the location for the stripe on the finished tire. The white strip must be laid and accurately positioned by hand as the carcass is built up. Two thin strips or laminations of black rubber are then laid by hand over the edges of the white rubber strip with each of the black strips also requiring careful positioning.

The resulting white stripe on the tire often is not concentric nor of uniform width because of the human element in laying up the tire carcass and also because of non-uniformity in the flow of the rubber during vulcanizing and curing. Therefore, it is necessary to grind concentric, circular edges on the white stripe as a subsequent operation, which is accomplished by removing a portion of each of the overlying strips of black rubber. At the same time, a portion of the white rubber is removed to recess the stripe.

The extra operations required for a white sidewall tire having a narrow white stripe render the manufacturing operation a costly one. A substantial part of the extra cost is expended in the labor involved building up the green tire with the white strip and the two separate thin black rubber strips individually and accurately laid by hand. If any of the three strips is out of position, the white stripe ground in the tire will not be of uniform width nor concentric. In such an instance, either the white rubber will exceed the bounds of the white stripe with the white area then extending beyond the normal edges of the stripe, or the white rubber will not reach to the intended edge of the white stripe, in which instance the white stripe will appear narrower at that point. Not only must the three strips be laid up individually, but they must be made in separate operations and then individually handled and cut to proper lengths. The uncured black rubber strips are particularly hard to handle because they are thin and sticky, and, when accidentally stuck together, usually cannot be separated without damage.

In adidtion to the handling operations, the cost is also increased by the fact that a relatively large strip of the white rubber is required in the manufacturing process. This arises from the fact that the sidewall of the tire must be built up beyond the plies to a given thickness. Because the thin black rubber strips contribute very little to this thickness, the white rubber strip must be sufficiently thick to achieve the proper thickness of the sidewall. Hence, the white rubber strip is substantially thicker and wider than actually required for the resulting white stripe. Because white rubber is more expensive than black rubber, this factor also adds to the manufacturing cost.

On each side of the white stripe resulting after the grinding operation, the white rubber is covered only by the thin strip or lamination of black rubber. This has an additional disadvantage in that when the pin vent projections, formed during curing, are cut from the cured tire, dots of the white rubber are visible through the black strips. These white dots must then be "painted," which requires an adidtional operation, and the dots usually again become visible after a period of time when the coating wears away. Under conditions of hard use, the thin black rubber strips also may be partially destroyed, as by abrasion, to expose more white rubber and ruin the appearance of the tire.

The process and white sidewall tire of the invention overcomes the above disadvantages and result in substantial savings in the cost of manufacture of the tire. In accordance with the invention, a single composite strip comprising a white rubber strip and contiguous black strip portions is made in a single extruding process or by separately extruding the strips and pressure-rolling them together. The composite strip is then applied to the carcass in one operation. The composite strip is much easier to handle than the three separate ones and does not require the extra cutting operations. This substantially reduces the time necessary to lay up the green white sidewall tire manually and reduces labor costs. In addition, the composite strip requires less white rubber than previously because the black rubber portions along the edges of the white strip are no longer in the form of thin strips or laminations but, rather, are extruded and are, in part, substantially as thick as the white rubber itself. Hence, a significant amount of white rubber is replaced by black rubber to further lower the cost of materials in the white sidewall tire. With reduction in white rubber and the replacement of part of the thin black rubber strips by thicker extruded strip portions of black rubber, there is also less chance for white rubber to be exposed at clipped pin vent projections and less chance for black rubber to be worn or abraded away to expose white rubber and mar the appearance of the tire.

It is, therefore, a principal object of the invention to provide an improved white sidewall tire, tire component, and method of manufacture having the advantages set forth above.

Other objects and advantages of the invention will be apparent from the following detailed description of preferred embodiments thereof, reference being made to the accompanying drawing, in which:

FIG. 1 is a fragmentary view in transverse cross section of a finished white sidewall tire having a narrow white stripe made in accordance with the invention;

FIG. 2 is an enlarged view in perspective of a composite white rubber and black rubber strip used to build up a green tire from which the tire of FIG. 1 is made;

FIG. 3 is a fragmentary view in transverse cross section of a green tire employing a separate white strip and black rubber laminations as heretofore known;

FIG. 4 is a schematic view in elevation of apparatus for producing a composite white and black rubber strip as shown in FIG. 2;

FIG. 5 is an enlarged, fragmentary view, with parts broken away and with parts in vertical cross section of extruders used in the apparatus of FIG. 4; and FIG. 6 is a sectional view taken along the line 6—6 of FIG. 5 and shown on an enlarged scale.

Referring to FIG. 1, part of a cured and finished white sidewall tire embodying the invention is shown in cross section and is indicated generally by the reference numeral 10. Except for the white sidewall area, the tire 10 is of conventional construction. It includes several plies 12, a tread portion 14, and rim beads 16. The white sidewall portion is formed by a composite strip 18 which is shown in more detail in FIG. 2. The composite strip 18 consists of a white rubber strip 20 and a black rubber body having two strip portions 22 and 24 contiguous with the edges of the white strip 20 and connected by a thin web 26, and said strip portions having rear surfaces forming smooth continuations of the rear surface of the light-colored rubber strip. After the tire 10 is cured, most of the thin web 26 as well as part of the white rubber strip 20 are ground away to form an annular recess 28 (FIG. 1) to expose a concentric narrow white stripe of uniform width.

FIG. 3 shows a white sidewall portion of a tire 30 which is similar to the tire 10, but made by the usual process heretofore employed. Rather than the composite strip 18 of the invention, the white sidewall portion of the tire 30 includes a separate, relatively wide white rubber strip 32 with two thin black rubber strips or laminations 34 and 36 overlapping the edges of the white strip 32. When the carcass for the tire 30 is laid up the white strip 32 must first be carefully laid in the proper position and cut to length. The black rubber strips 34 and 36 must subsequently be carefully laid in their proper positions and cut to length with each of the strips 34 and 36 being calendered after being laid. A solvent is often applied to the carcass before the strips are positioned. Hence, a number of operations are required in addition to simply placing the three strips on the carcass. Before being applied to the carcass, the three strips also must be manufactured and then handled several times, which requires more time and labor. The uncured, thin strips 34 and 36 of black rubber are particularly hard to handle because they are flexible and sticky, and portions thereof will readily adhere together if accidentally placed in contact. When this happens, the adhered portions usually cannot be separated without damage.

A comparison of FIGS. 2 and 3 brings out another advantage of the new composite strip 18, that the white rubber strip 20 of FIG. 2 is substantially narrower than the white strip 32 heretofore known. The sidewall of the tire 10 or 30 must be built up to a given thickness with white rubber, black rubber, or both. With the known technique, the proper thickness cannot be achieved primarily by the use of black rubber since the black rubber exists only in the thin laminations 34 and 36. Consequently, the white rubber strip 32 must be much thicker and wider than that required for the white stripe to achieve the desired sidewall thickness. With the composite strip 18, the rubber strip portions 22 and 24, being extruded, can be made much thicker than the laminations 34 and 36 and are substantially as thick as the white rubber strip 20 particularly near the edges of the strip 20. Hence, with the composite strip, black rubber is substituted for a significant part of the more expensive white rubber.

With the known manufacturing process employing the separate strips of FIG. 3, even after the white rubber stripe is ground and part of the edges of the laminations 34 and 36 are removed, substantial portions of the laminations 34 and 36 overlying edge portions of the white rubber 32 still remain. Two principal disadvantages result from a large part of the white rubber strip 32 being covered by the thin black rubber laminations 34 and 36. First, pin vent projections are formed during vulcanization of a tire, with the projections on the sidewalls being clipped off just before final inspection. The white rubber shows through those clipped pin vent projections located on the portions of the strips 34 and 36 overlying the white rubber strip 32. The resulting white dots then must be "painted" black in order to camouflage them and this black coating frequently wears off after a period of time. The second disadvantage of the overlying thin black rubber is that it can be abraded and physically removed from the tire by rough use, such as by roughly contacting a curb. Removal of the black rubber exposes more of the white rubber of the strip 32 underneath, resulting in an unsightly tire because of the wide white portion of the stripe then visible.

The composite strip 18 can be extruded as a single piece or as separate pieces and subsequently molded together by a pressure roll. In either instance, the composite strip 18 is handled as a single unit. It is laid on the tire carcass in one piece and is handled throughout the operation as one piece, which substantially reduces labor costs in the manufacture of narrow white sidewall tires. In addition, the junction between the white rubber strip 20 and the black rubber strips 22 and 24 is much more abrupt with the black rubber strip portions 22 and 24 replacing part of the white rubber otherwise required with thin strips or laminations, as shown in FIG. 3. This achieves a material savings in the more expensive white rubber. With the relatively abrupt joints between the white rubber and black rubber portions, the problem of white dots appearing at severed pin vent projections is also reduced, since there is at the most only a very small area in which the black rubber is so thin that the white rubber will be forced into the pin vent projections and be visible when the projections are severed. Further, there is little if any area in which the black rubber of the portions 22 and 24 is so thin over the white rubber strip 20 that the black rubber can be torn away. Hence, it is substantially impossible for unwanted white rubber to be exposed as can happen with the tire 30 of FIG. 3.

The composite strip 18 can be made in only two pieces as shown with the black rubber constituting a single body with the portions 22 and 24 integral with the connecting web 26. This is particularly advantageous where the black rubber and the white rubber are extruded separately and then squeezed together by a pressure roll. However, particularly when the portions are extruded together in one operation, the black rubber portions 22 and 24 need not be connected together by the web 26 but can be separate pieces with the white rubber strip 20 visible between them at the exposed surface of the strip. In either case, the composite strip 18 is used in the same manner and the advantages are the same. Where the complete connecting web 26 is used, the white strip 20 will not be visible at the sidewall of the tire. However, identification of the white sidewall tire before grinding is achieved when the pin vent projections are severed. In that instance, the severed pin vent projections on the connecting web 26 will show white dots from the white rubber strip 20 underneath, so that identification of the tire will be assured without necessity for additional operations to expose the white rubber for identification.

The composite strip 18 can be made with the apparatus shown in FIGS. 4 and 5 which includes a white rubber extruder 38 and a black rubber extruder 40. In both of the extruders 38 and 40, mushy, heated rubber is supplied through hoppers 42 and 44 to central cylinders 46 and 48 through which the rubber is pushed to dieheads 50 and 52 by water-cooled augers 54 and 56 driven by motors 58 and 60, respectively. Water-cooled rings 62 and 64 also are located near the die-heads 50 and 52 to cool the rubber to make it of proper consistency. The die-heads 50 and 52 contain passages 66 and 68 of appropriate shape to form the white strip 20 and the black rubber body of the composite strip 18. The passages converge at the lower edges of the die-heads 50 and 52 and direct the composite strip to a final shaping die 70 which establishes the final shape of the strip 18.

After the composite strip 18 is formed, it is carried by a conveyor 72 into a cooling tank 74, after which it is wound on a suitable coil (not shown) which is subsequently transported to the station at which the tire carcasses are built so that the strip can be immediately and conveniently used.

While the invention has been illustrated in connection with a tire having recessed white stripes, it can also be used with tires having protruding white stripes.

Various modifications of the above described embodiment of the invention will be apparent to those skilled in the art, and it is to be understood that such modifications can be made without departing from the scope of the invention, if they are within the spirit and the tenor of the accompanying claims.

What we claim is:

1. A method of making a composite strip for forming a light-colored stripe on a sidewall of a tire carcass, which method comprises extruding a strip of light-color rubber having a width several times its thickness, extruding a layer of black rubber having two thicker portions connected by a thin web with the width of the web not substantially exceeding the width of said light-colored rubber strip, and adhering said light-colored rubber strip to said black rubber layer with the thicker portions of said black rubber layer contiguous with edge portions of said light-colored rubber strip and with said thin web overlying the light-colored rubber strip.

2. A method of making a composite strip for a carcass of a light-colored sidewall tire for forming a narrow light-colored stripe thereon, said method comprising extruding a strip of light-colored rubber having a width exceeding the width of the light-colored stripe, said strip having a width several times its thickness, extruding two black rubber portions along the edges of said light-colored rubber strip, said portions being of substantially the same length as said strip, and at least parts of said black rubber portions being approximately as thick as the edge portions of said light-colored rubber strip, and adhering said black rubber portions to the edge portions of said light-colored rubber strip.

3. In a method of laying up a carcass for a light-colored sidewall tire having a narrow light-colored stripe, which includes the steps of assembling a plurality of plies and adhering a tread to the plies, the improvement comprising extruding a strip of light-colored rubber, extruding a strip of black rubber, adhering the black rubber strip to said light-colored rubber strip with said black rubber strip overlying an edge of said light-colored rubber strip and extending beyond the edge thereof, and adhering the composite strip to the carcass in a position corresponding to the position in which the light-colored stripe will be formed on the tire.

4. The method according to claim 3 characterized further by subsequently grinding away a portion of the black rubber strip and a portion of the light-colored strip immediately thereunder to expose a concentric, narrow, light-colored stripe of uniform width.

5. In a method of laying up a carcass for a light-colored sidewall tire having a narrow light-colored stripe, which method includes the step of assembling a plurality of plies and adhering a tread to the plies, the improvement comprising forming a strip of light-colored rubber having a width several times its thickness, forming black rubber portions along the edges of said light-colored rubber strip, said black rubber portions being of substantially the same length as said strip, and said black rubber portions being in part approximately as thick as edge portions of said light-colored rubber strip and tapering to thin edges away from said strip, adhering the black rubber portions to said light-colored rubber strip in contiguous relationship with the edge portions of said light-colored rubber strip, and adhering the composite strip to the tire carcass in a position corresponding to the position in which the light-colored stripe will be formed on the tire.

References Cited

UNITED STATES PATENTS

| 1,913,330 | 6/1933 | Brickman | 161—240 X |
| 3,285,314 | 11/1966 | Roberts | 152—353 |
| 3,296,061 | 1/1967 | Tavenor et al. | 161—240 |
| 3,322,610 | 5/1967 | Brooks et al. | 156—244 X |

FOREIGN PATENTS 1,342,575  9/1963  France.

EARL M. BERGERT, *Primary Examiner.*

HAROLD ANSHER, *Examiner.*